United States Patent
Chikahisa

(10) Patent No.: US 10,928,643 B2
(45) Date of Patent: Feb. 23, 2021

(54) LIGHT SOURCE DEVICE INCLUDING LASER LIGHT SOURCES, PROJECTOR, AND SPECKLE REDUCTION METHOD FOR FORMING LIGHT BY MIXING DIFFUSED LIGHTS EMITTED FROM LASER LIGHT SOURCE GROUPS

(71) Applicant: NEC Display Solutions, Ltd., Tokyo (JP)

(72) Inventor: Shinichiro Chikahisa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/490,128

(22) PCT Filed: Mar. 23, 2017

(86) PCT No.: PCT/JP2017/011748
§ 371 (c)(1),
(2) Date: Aug. 30, 2019

(87) PCT Pub. No.: WO2018/173200
PCT Pub. Date: Sep. 27, 2018

(65) Prior Publication Data
US 2020/0004038 A1    Jan. 2, 2020

(51) Int. Cl.
*G02B 27/48* (2006.01)
*H04N 9/31* (2006.01)
(Continued)

(52) U.S. Cl.
CPC ......... *G02B 27/48* (2013.01); *G02B 27/0905* (2013.01); *G03B 21/008* (2013.01);
(Continued)

(58) Field of Classification Search
CPC .. G02B 27/48; G02B 27/0905; G02B 27/106; G02B 27/14; G03B 21/008;
(Continued)

(56) References Cited

U.S. PATENT DOCUMENTS 6,606,173 B2 * 8/2003 Kappel ................ H04N 5/7441
348/E5.141
7,554,737 B2 * 6/2009 Knox ................... G02B 5/0215
359/15
(Continued)

FOREIGN PATENT DOCUMENTS

| CN | 103676428 A | 3/2014 |
| CN | 103969929 A | 8/2014 |

(Continued)

OTHER PUBLICATIONS

International Search Report (ISR) (PCT Form PCT/ISA/210), in PCT/JP2017/011748, dated Jun. 13, 2017.
(Continued)

*Primary Examiner* — Bao-Luan Q Le
(74) *Attorney, Agent, or Firm* — McGinn I.P. Law Group, PLLC.

(57) ABSTRACT

A light source device includes: a light source unit provided with a plurality of laser light sources provided in an array, the laser light sources being divided into first and second laser light source groups; a first diffusion plate that diffuses light emitted by the first laser light source group and emits first diffused light; a second diffusion plate that diffuses light emitted by the second laser light source group and emits second diffused light having a diffusion angle greater than that of the first diffused light; and optical path merging members that bend the optical path of the first diffused light to merge the optical path of the first diffused light with the optical path of the second diffused light and supply third
(Continued)

diffused light in which the first and second diffused light are mixed.

20 Claims, 3 Drawing Sheets

(51) Int. Cl.
  *G03B 21/00* (2006.01)
  *G02B 27/09* (2006.01)
  *G03B 21/20* (2006.01)
(52) U.S. Cl.
  CPC ..... *G03B 21/2013* (2013.01); *G03B 21/2033* (2013.01); *G03B 21/2066* (2013.01); *H04N 9/3129* (2013.01)
(58) Field of Classification Search
  CPC ............ G03B 21/2013; G03B 21/2033; G03B 21/2066; G03B 21/208; H04N 9/3129; H04N 9/3161; H04N 9/3164; H04N 9/3167
  See application file for complete search history.

(56) References Cited

U.S. PATENT DOCUMENTS

| | | | |
|---|---|---|---|
| 8,215,776 B2 | 7/2012 | Kessler et al. | |
| 8,334,937 B2 * | 12/2012 | Kaise | H04N 9/3108 349/8 |
| 9,641,828 B2 * | 5/2017 | Kurashige | H04N 13/341 |
| 9,958,765 B2 * | 5/2018 | Okuda | G02B 27/0927 |
| 9,979,939 B2 * | 5/2018 | Tian | G02B 26/0833 |
| 2002/0075460 A1 * | 6/2002 | Kappel | H04N 9/3152 353/102 |
| 2006/0291020 A1 * | 12/2006 | Knox | G02B 27/0944 359/15 |
| 2009/0323030 A1 * | 12/2009 | Hazama | G02B 27/0944 353/38 |
| 2010/0315597 A1 * | 12/2010 | Powell | G03B 21/208 353/20 |
| 2011/0141439 A1 * | 6/2011 | Yamauchi | G02B 27/1046 353/31 |
| 2013/0169936 A1 * | 7/2013 | Kurashige | F21V 9/14 353/20 |
| 2014/0232992 A1 * | 8/2014 | Egawa | G03B 21/208 353/30 |
| 2016/0150225 A1 * | 5/2016 | Kurashige | G03B 21/2013 353/8 |
| 2016/0223892 A1 * | 8/2016 | Takahashi | F21V 9/45 |
| 2016/0223895 A1 * | 8/2016 | Okuda | G03B 21/2066 |
| 2017/0048501 A1 * | 2/2017 | Li | G02B 30/23 |
| 2017/0111621 A1 * | 4/2017 | Tian | G02B 26/0875 |
| 2017/0227837 A1 * | 8/2017 | Okuda | G02B 27/0961 |
| 2017/0334341 A1 * | 11/2017 | Kurashige | F21S 41/365 |
| 2018/0180251 A1 * | 6/2018 | Tian | G03B 21/204 |

FOREIGN PATENT DOCUMENTS

| | | |
|---|---|---|
| CN | 104111532 A | 10/2014 |
| CN | 104238248 A | 12/2014 |
| CN | 105025279 A | 11/2015 |
| CN | 105229529 A | 1/2016 |
| CN | 106165412 A | 11/2016 |
| JP | 2015-141393 A | 8/2015 |
| JP | 2015-194605 A | 11/2015 |
| JP | 2015-230866 A | 12/2015 |
| WO | WO 2012/141254 A1 | 10/2012 |
| WO | WO 2015-149877 A1 | 10/2015 |

OTHER PUBLICATIONS

Chinese Office Action, dated Nov. 13, 2020, in Chinese Application No. 201780088589.7 and English Translation thereof.

* cited by examiner

[Fig. 1]
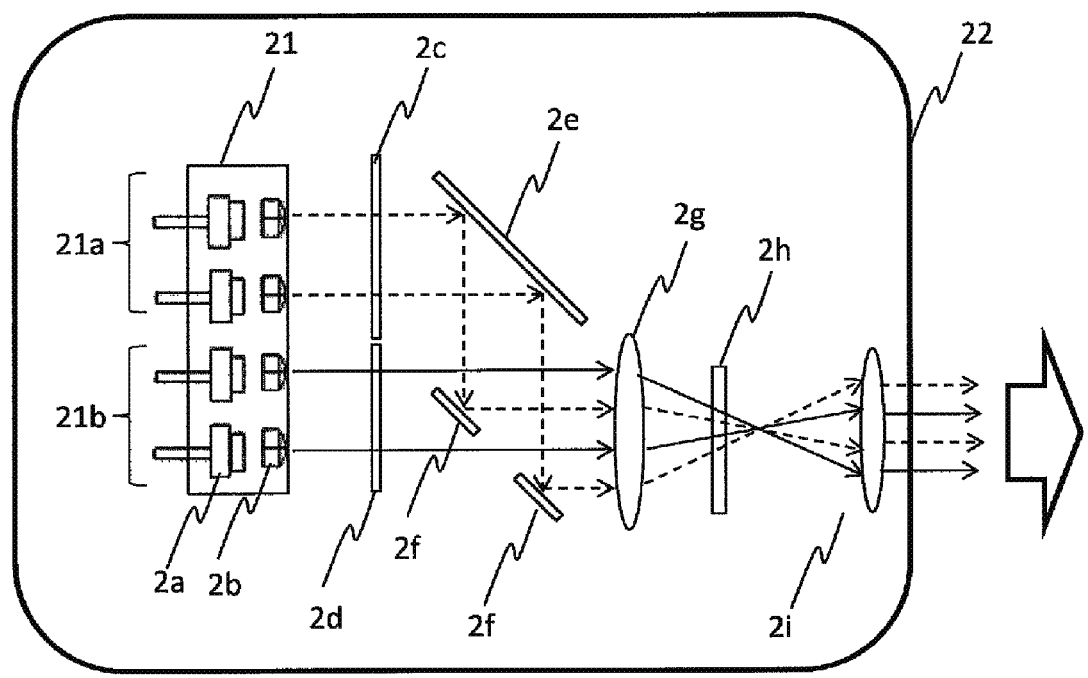
[Fig. 2]
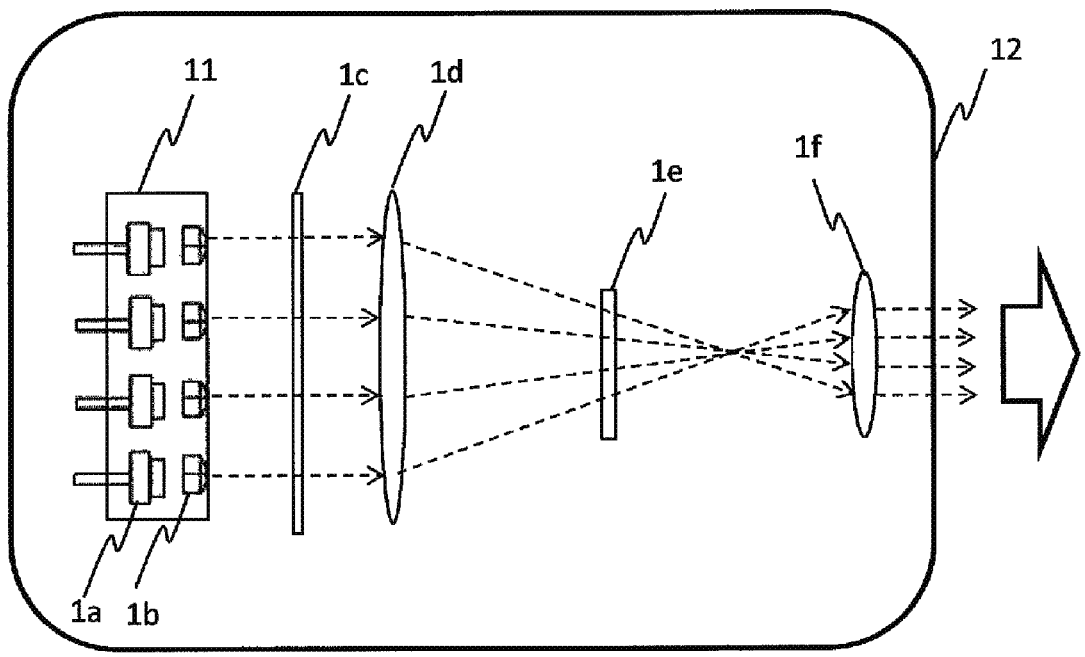

[Fig. 3]
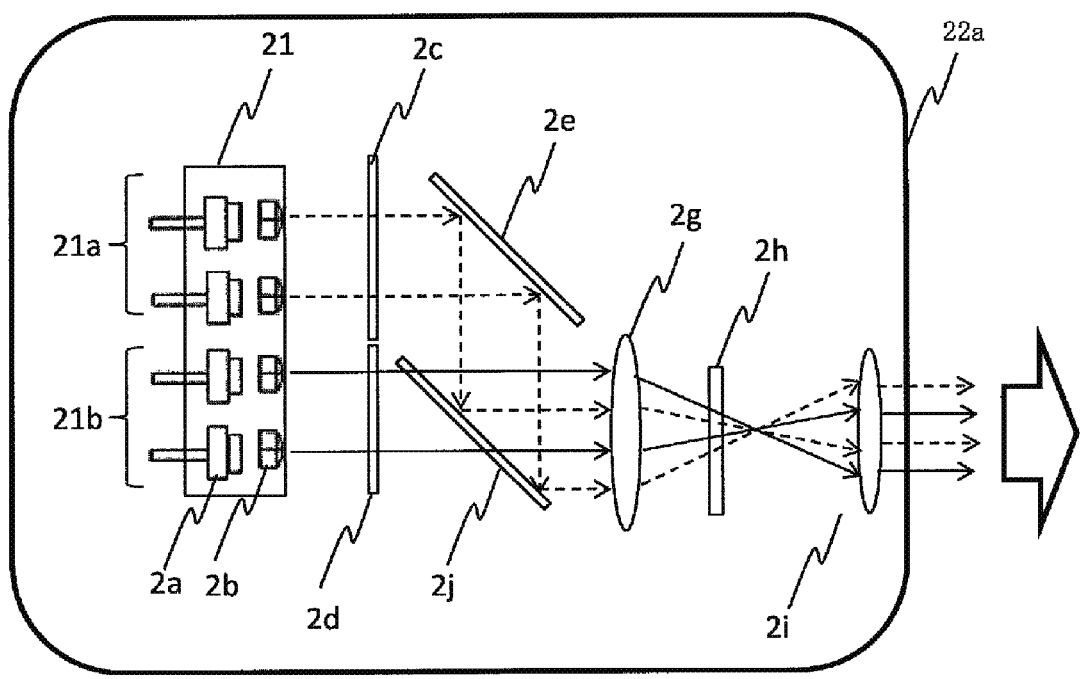

[Fig. 4]
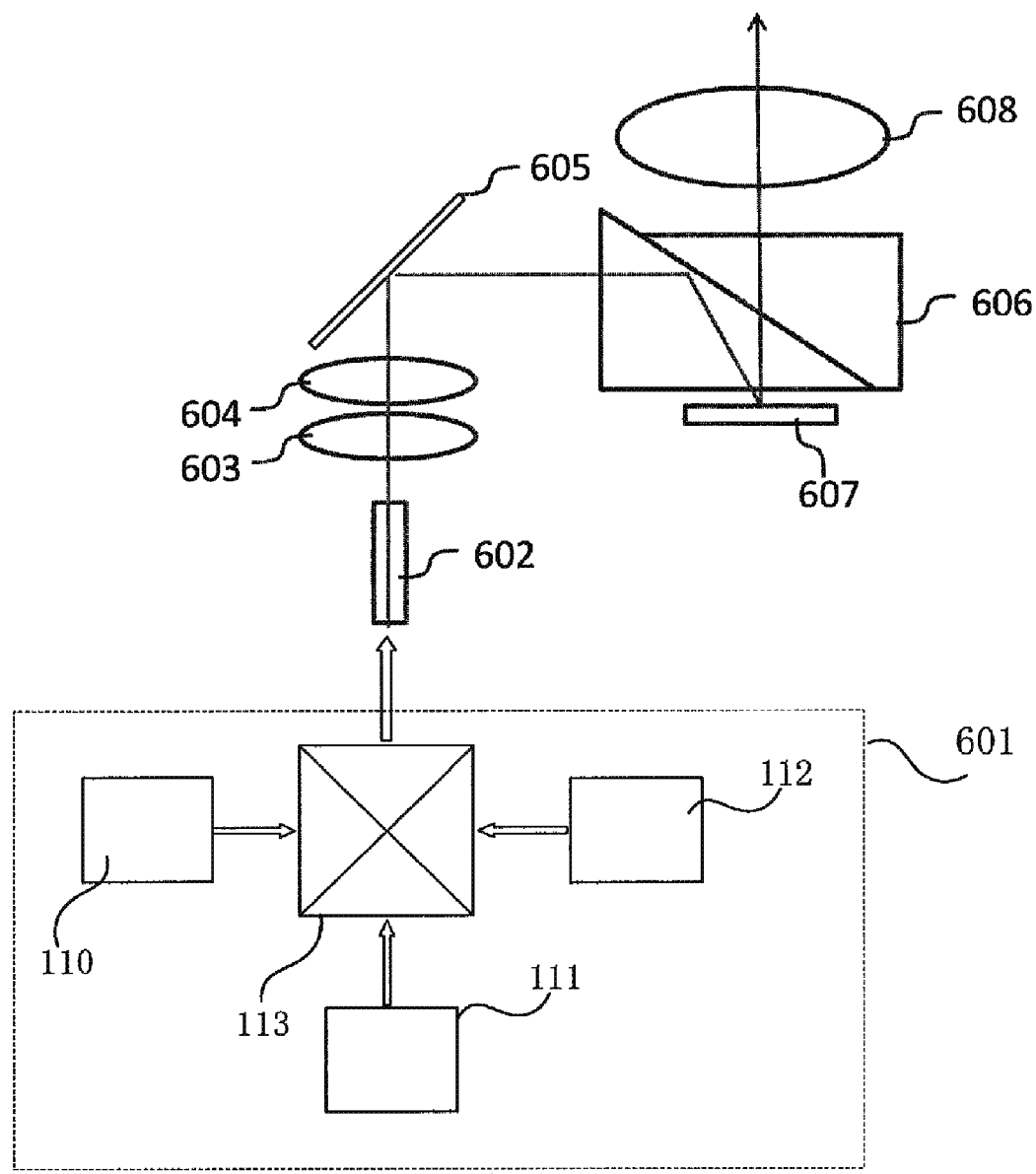

LIGHT SOURCE DEVICE INCLUDING LASER LIGHT SOURCES, PROJECTOR, AND SPECKLE REDUCTION METHOD FOR FORMING LIGHT BY MIXING DIFFUSED LIGHTS EMITTED FROM LASER LIGHT SOURCE GROUPS

TECHNICAL FIELD

The present invention relates to a light source device that is provided with a laser light source and to a projector and a speckle reduction method that uses this light source device.

BACKGROUND ART

A laser light source has longer life and higher reliability than such light sources as mercury lamps. As a result, among recent projectors, many projectors use laser light sources as the light sources that illuminate display elements such as DMDs (Digital Micromirror Devices) and LCDs (Liquid Crystal Displays).

However, image deterioration occurs due to speckle in the projectors described above, and measures for reducing speckle must therefore be implemented. Here, speckle is a pattern of light and dark blotches that occurs when coherent light such as laser light is irradiated upon a rough surface having unevenness greater than the wavelength.

One countermeasure for speckle is a method of using a diffusion plate to diffuse laser light. Diffusing the laser light reduces coherence and enables the achievement of incoherence. Patent Document 1 describes an illumination device in which a speckle reduction is achieved through the use of two diffusion plates.

The illumination device described in Patent Document 1 emits illumination light that contains blue laser light and yellow fluorescence. Explanation regarding the fluorescent light source unit that emits yellow fluorescence is omitted hereinbelow, but a simple description is presented regarding the configuration of the blue light source unit that emits blue laser light relating to a countermeasure for speckle.

The blue light source unit includes a plurality of blue LDs (laser diodes) that are arranged in an array, a collimator lens array that collimates the emitted light beams of each blue LD, and first and second diffusion plates that are provided on the optical path of the emitted light of the collimator lens array.

The first diffusion plate diffuses the blue laser light that is emitted from the collimator lens array. The emitted light of the first diffusion plate is irradiated into the second diffusion plate. The second diffusion plate further diffuses the light that was diffused from the first diffusion plate. The second diffusion plate is of a wheel form and can be caused to rotate with its center as the center of rotation. Causing the second diffusion plate to rotate changes the region of the second diffusion plate through which passes the diffused light from the first diffusion plate, whereby the effect of reducing coherence is increased.

In the above-described blue light source unit, a speckle reduction is achieved by using first and second diffusion plates to diffuse the laser light.

However, projectors are typically subject to the constraint known as etendue that is defined as the product of the cross-section area of luminous flux and the divergence angle (the solid angle determined by light). In order to efficiently use the light from a light source as projection light, the radiation-side etendue must be made no greater than the intake-side etendue. Here, the radiation-side etendue is obtained by the multiplication value of the area of the light source and the divergence angle of light that is emitted by the light source, and the intake-side etendue is given by the multiplication value of the area of the display element and the acceptance angle (solid angle) that is determined by the f-number of the projection lens.

In a case in which speckle reduction is achieved by using a diffusion plate to diffuse laser light, the effect of reducing speckle increases with increases in the diffusion angle (spread angle) of the laser light. However, when the diffusion angle of laser light is increased in order to reduce speckle, the radiation-side etendue also increases, and the light utilization efficiency decreases. On the other hand, when the diffusion angle of laser light is decreased in order to limit the decrease of the light utilization efficiency, a sufficient speckle reduction effect can no longer be obtained. There is consequently a trade-off relation between the effect of reducing speckle and the light utilization efficiency.

LITERATURE OF THE PRIOR ART

Patent Documents

Patent Document 1: Japanese Unexamined Patent Application Publication No. 2015-194605

DISCLOSURE OF THE INVENTION

Technical Problem

Although the effect of reducing speckle can be achieved by diffusing laser light in the blue light source unit described in Patent Document 1, the problem arises that the radiation-side etendue increases and the light utilization efficiency therefore decreases.

In addition, there is the further problem that the necessity for a drive device such as a motor to rotate the second diffusion plate increases cost and increases the size of the device.

It is an object of the present invention to provide: a light source device that can both reduce speckle, and further, reduce decrease of light utilization efficiency; as well as a projector that uses this light source device; and a speckle reduction method.

Solution to Problem

According to an aspect of the present invention for achieving the above-described object, a light source device is provided that includes:

a light source unit provided with a plurality of laser light sources that are arranged in an array wherein the laser light sources are divided into a first laser light source group and a second laser light source group;

a first diffusion plate that diffuses light emitted from the first laser light source group and that emits a first diffused light;

a second diffusion plate that diffuses light emitted from the second laser light source group and that emits a second diffused light having a larger diffusion angle than the first diffused light; and an optical path merging member that bends an optical path of the first diffused light to merge with an optical path of the second diffused light and that supplies a third diffused light in which the first and second diffused light are mixed.

According to another aspect of the present invention, a projector is provided that includes:

the above-described light source device;

a display device that modulates light emitted from the light source device to form an image; and a projection lens that projects the image formed by the display device.

According to yet another aspect of the present invention, a method of reducing a speckle in a projector that is provided with a plurality of laser light sources provided in an array, the method including:

dividing the plurality of laser light sources into a first laser light source group and a second laser light source group;

forming a first diffused light by diffusing light emitted from the first laser light source group by a first diffusion plate;

forming a second diffused light having a diffusion angle that is larger than that of the first diffused light by diffusing light emitted from the second laser light source group by a second diffusion plate; and bending an optical path of the first diffused light to merge with an optical path of the second diffused light and forming a third diffused light in which the first and second diffused light are mixed.

Effect of the Invention

The present invention is able to both reduce speckle, and moreover, limit a decrease in light utilization efficiency.

BRIEF DESCRIPTION OF THE DRAWINGS

FIG. 1 is a schematic view showing the configuration of the light source device according to the first exemplary embodiment of the present invention.

FIG. 2 is a schematic view showing the configuration of a light source device that is a comparative example.

FIG. 3 is a schematic view showing the configuration of a light source device according to the second exemplary embodiment of the present invention.

FIG. 4 is a schematic view showing the configuration of a projector according to an exemplary embodiment of the present invention.

EXAMPLE EMBODIMENTS

Exemplary embodiments of the present invention are next described with reference to the accompanying drawings.

First Exemplary Embodiment

FIG. 1 is a schematic view showing the configuration of a light source device according to the first exemplary embodiment of the present invention.

Referring to FIG. 1, light source device 22 includes light source unit 21, diffusion plates 2c, 2d, and 2h, reflecting mirrors 2e and 2f, and lenses 2g and 2i.

Light source unit 21 includes a plurality of blue LDs 2a that are arranged in an array, and a plurality of collimator lenses 2b that each convert a respective blue laser light beam emitted from these blue LDs 2a to parallel light. The plurality of blue LDs 2a are used divided between first laser light source group 21a and second laser light source group 21b. Here, a total of eight blue LDs 2a in four (rows) and two (columns) are provided, first laser light source group 21a and second laser light source group 21b both being made up of a total of four blue LDs 2a in two (rows) and two (columns). The number and arrangement of blue LDs 2a of light source unit 21 overall and the number and arrangement of blue LDs 2a that make up laser light source groups 21a and 21b can be altered as appropriate according to the specifications of light source device 22.

Diffusion plate 2c diffuses blue laser light that is emitted from each blue LD 2a of first laser light source group 21a. Diffusion plate 2d diffuses the blue laser light that is emitted from each blue LD 2a of second laser light source group 21b. The diffusion angle of diffusion plate 2d is greater than the diffusion angle of diffusion plate 2c. Here, the diffusion angle is the angle of spread (angle of divergence) of light that has passed through the diffusion plate when linear light rays are irradiated perpendicular to the diffusion plate. When convergent light (or divergent light) is irradiated into a diffusion plate, the angle of divergence of the emitted light of the diffusion plate is determined according to the angle of convergence of the irradiated light (the angle of divergence in the case of divergent light) and the diffusion angle of the diffusion plate.

Examples of a diffusion plates that allow selection of the diffusion angle include a diffraction-type diffusion plate in which micro-unevenness realized by a hologram interference wave front is formed on the surface of a transparent substrate and a frosted-type diffusion plate in which the surface has a frosted-glass finish realized by grinding with fine particles of sand. In the diffraction-type diffusion plate, the diffusion angle depends on the degree of unevenness. In the frosted-type diffusion plate, the diffusion angle (the degree of diffusion) depends on the roughness (grit) of the frosted glass surface.

Reflecting mirror 2e bends the optical path of the first diffused light that was emitted from diffusion plate 2c by an angle of approximately 45 degrees. The first diffused light includes a plurality of blue laser light beams (diffused light) emitted from each blue LD 2a of first laser light source group 21a. These laser light beams are reflected by a reflection angle of approximately 45 degrees by reflecting mirror 2e. Here, the angle of reflection is the angle formed by the principal ray of the reflected light and the normal to the reflecting surface.

The optical path of the reflected light of each blue laser light beam from reflecting mirror 2e intersects with the optical path of the second diffused light that is emitted from diffusion plate 2d, and a plurality of reflecting mirrors 2f are provided at this intersecting portion. Each of reflecting mirrors 2f has a one-to-one correspondence with a respective blue LD 2a of first laser light source group 21a and reflects the blue laser light from the corresponding blue LD2a by approximately a reflection angle of 45 degrees.

The second diffused light includes a plurality of blue laser light beams (diffused light) emitted from each of blue LDs 2a of second laser light source group 21b. Third diffused light in which these blue laser light beams (diffused light) and the reflected light beams from each of reflecting mirrors 2f are mixed is irradiated into lens 2g on the same optical path.

When the above-described intersecting portion is viewed from the side of lens 2g, the optical paths of the blue laser light beams that make up the second diffused light are separated from each other by a prescribed distance, and reflecting mirrors 2f are arranged among these optical paths. Each reflecting mirror 2f is able to reflect each blue laser light beam of the first diffused light, and moreover, is arranged so as not to obstruct each blue laser light of the second diffused light. The optical paths of each blue laser light beam of the first diffused light and the optical paths of each blue laser light beam of the second diffused light are alternately arranged in the same plane that intersects the optical paths of the third diffused light.

Lenses 2g and 2i are a reduction optical system for reducing the light source images of each laser light source 2a of light source unit 21 and are configured such that the front-side focal point of lens 2i coincides with the rear-side focal point of lens 2g. The reduction optical system in FIG. 1 is made up of two lenses 2g and 2i but is not limited to this form. The reduction optical system may also be made up by three or more lenses.

Diffusion plate 2h further diffuses the above-described third diffused light. Diffusion plate 2h can be arranged at an appropriate position between lenses 2g and 2i. Arranging diffusion plate 2h between lenses 2g and 2i enables a reduction of the size of diffusion plate 2h. Diffusion plate 2h here is arranged toward the lens 2g-side from the rear-side focal point of lens 2g and diffuses the third diffused light that is focused at lens 2g. The light emitted from lens 2i is the emitted light of light source device 22 of the present exemplary embodiment.

The action and effects of light source device 22 of the present exemplary embodiment are next specifically described. In the following explanation, a comparative example is taken up to describe in specific terms both the problems of the comparative example and the action and effects of light source device 22 of the present exemplary embodiment.

Comparative Example

FIG. 2 shows the configuration of the light source device that is the comparative example.

Referring to FIG. 2, light source device 12 includes light source unit 11, diffusion plates 1c and 1e, and lenses 1d and 1f. Light source unit 11 includes a plurality of blue LDs 1a that are arranged in an array, and a plurality of collimator lenses 1b that each convert a respective beam of blue laser light emitted from blue LDs 1a to parallel light. Blue LDs 1a and collimator lenses 1b are similar to blue LDs 2a and collimator lenses 2b shown in FIG. 1, a total of eight blue LDs 1a being arranged in four (rows) and two (columns).

Diffusion plate 1c diffuses the blue laser light that is emitted from each blue LD 1a of light source unit 11. The diffused light from diffusion plate 1c is irradiated into lens 1d. Lenses 1d and 1f are a reduction optical system for reducing the light source image of each laser light source 1a of light source unit 11 and are configured such that the front-side focal point of lens 1f coincides with the rear-side focal point of lens 1d.

Diffusion plate 1e is between lenses 1d and 1f and is arranged on the lens-1d side from the rear-side focal point of lens 1d. Diffusion plate 1e further diffuses diffused light that is transmitted through lens 1d. Although not shown in the figure, a drive device causes diffusion plate 1e to rotate or vibrate, whereby the coherence of the laser light can be further mitigated.

When the diffusion angle of laser light is increased for the purpose of speckle reduction in light source device 12, the radiation-side etendue increases and the light utilization efficiency decreases. On the other hand, when the diffusion angle of the laser light is decreased for the purpose of reducing a decrease in the light utilization efficiency, the effect of reducing speckle can no longer be sufficiently obtained.

In contrast, in light source device 22 of the present exemplary embodiment, light source 21 is provided with blue LDs 2a in four (rows) and two (columns) similar to the light source 11 described above, but these blue LDs 2a are divided into first laser light source group 21a and second laser light source group 21b. First laser light source group 21a and second laser light source group 21b are each composed of blue LDs 2a in two (rows) and two (columns), and the size of the light source images (light source area) is therefore one-half that of the above-described light source 11.

The optical path of first laser light source group 21a is bent by reflecting mirrors 2e and 2f to integrate with the optical path of second laser light source group 21b. By merging these optical paths, the size (light source area) of the light source image of light source 21 is approximately one-half that of above-described light source 11, and the radiation-side etendue can therefore be made smaller than that of the above-described light source 11.

In addition, because the optical path of first laser light source group 21a is bent by reflecting mirrors 2e and 2f, the length of this optical path is longer than the optical path of second laser light source group 21b. Taking advantage of this difference in optical path lengths, diffusion plates 2c and 2d having different diffusion angles are used. Diffusion plate 2c that has a smaller diffusion angle is arranged on the optical path of first laser light source group 21a that has the longer optical path, and diffusion plate 2d that has a larger diffusion angle is arranged on the optical path of second laser light source group 21b that has the shorter optical path. The diffusion angle of the first diffused light from diffusion plate 2c is smaller than the diffusion angle of the second diffused light from diffusion plate 2d. Mixing together first and second diffused light having these different diffusion angles enables a decrease of coherence and, consequently, an increase of the effect of reducing speckle.

Still further, when compared with light source device 12 described above, the diameter of the pencil of light rays that passes through diffusion plate 2d is substantially half the diameter of the pencil of light rays that passes through diffusion plate 1c, whereby a margin is obtained in the limit imposed on radiation-side etendue. The diffusion angle of diffusion plate 2d can be made larger than that of diffusion plate 1c in proportion to this margin, and increasing the diffusion angle of diffusion plate 2d enables an increase of the speckle reduction effect.

In addition, the diameter of the pencil of light rays that passes through diffusion plate 2c is also substantially one-half the diameter of the pencil of light rays that passes through diffusion plate 1c, whereby a margin is obtained in the limit imposed on the radiation-side etendue. Taking this margin into consideration, the diffusion angle of diffusion plate 2c is set such that the light utilization efficiency does not decrease despite lengthening of the optical path. A decrease in the light utilization efficiency is thus reduced.

Still further, in light source device 12 described above, a sufficient speckle reduction effect is not obtained just by the diffusion action of diffusion plates 1c and 1e, and diffusion plate 1e is therefore vibrated or rotated.

According to light source device 22 of the present exemplary embodiment, the effect of reducing speckle can be increased by the diffusion action of diffusion plates 2c and 2d, and a speckle reduction effect that is equivalent to or greater than that of the comparative example can therefore be obtained even without vibrating or rotating diffusion plate 2h.

Second Exemplary Embodiment

FIG. 3 is a schematic view showing the configuration of a light source device that is the second exemplary embodiment of the present invention.

Light source device 22a of the present exemplary embodiment differs from the first exemplary embodiment in that polarization beam splitter 2j is used in place of reflecting mirrors 2f.

Polarization beam splitter 2j is provided in the portion of intersection of the optical path of reflected light from reflecting mirror 2e and the optical path of the emitted light of diffusion plate 2d. Polarization beam splitter 2j has the property of reflecting first polarized light and transmitting second polarized light for which the direction of polarization differs from that of the first polarized light. Here, the first polarized light is assumed to be S-polarized light and the second polarized light is assumed to be P-polarized light.

Each blue LD 2a of first laser light source group 21a is configured such that S-polarized light is irradiated into one surface of polarization beam splitter 2j. Each blue LD 2a of second laser light source group 21b is configured such that P-polarized light is irradiated into the other surface of polarization beam splitter 2j.

The emitted light of each blue LD 2a of first laser light source group 21a is diffused by diffusion plate 2c, and this diffused light is irradiated by way of reflecting mirror 2e as S-polarized light into one surface of polarization beam splitter 2j. On the other hand, the emitted light of each blue LD 2a of second laser light source group 21b is diffused by diffusion plate 2d, and this diffused light is irradiated as P-polarized light into the other surface of polarization beam splitter 2j. The diffused P-polarized light is transmitted through polarization beam splitter 2j, and the diffused S-polarized light is reflected in the same direction as the transmitted light in polarization beam splitter 2j. In other words, polarization beam splitter 2j emits the diffused P-polarized light and diffused S-polarized light on the same optical path.

The same effects as the first exemplary embodiment are exhibited by light source device 22a of the present exemplary embodiment.

In addition, each blue LD 2a must be arranged with a certain amount of spacing such that the second diffused light from diffusion plate 2d is not obstructed by reflecting mirrors 2f. In contrast, the use of polarization beam splitter 2j in place of reflecting mirrors 2f in the present exemplary embodiment eliminates this constraint upon the spacing of blue LDs 2a that is imposed by reflecting mirrors 2f. As a result, light source device 22a of the present exemplary embodiment is able to further reduce the spacing of blue LDs 2a compared to the first exemplary embodiment and is therefore able to reduce the light source area. In this way, a still greater margin can be realized regarding the limitation imposed on radiation-side etendue, the diffusion angle of diffusion plate 2d can be further increased, and the effect of reducing speckle can be increased.

The light source devices of each of the exemplary embodiments described hereinabove are merely examples of the present invention, and the configurations are open to various modifications or improvements that will be understood by those of ordinary skill in the art within a scope that does not diverge from the gist of the present invention.

For example, red LDs or green LDs may be used in place of blue LDs 2a in the first or second exemplary embodiment.

Alternatively, in the second exemplary embodiment, all of blue LDs 2a of light source unit 21 may be arranged to become first polarized light, and a polarization conversion element that converts the first polarized light to second polarized light may be provided on the optical path of each blue LD 2a of first laser light source group 21a or second laser light source group 21b. The polarization conversion element can be constituted by using a wave plate, for example a half-wave plate. Alternatively, instead of using a polarization conversion element, laser light source group 21a may be arranged such that the direction of polarization differs by 90 degrees from that of laser light source group 21b.

Projector

An exemplary embodiment of a projector that uses the light source device of the present invention is next described.

The projector of the present exemplary embodiment includes a light source device of the first or second exemplary embodiment described above, a display device that modulates the light that is emitted from this light source device to form images, and a projection lens that projects the images that are formed by this display device. A DMD or an LCD can be used as the display device.

The projector may be constructed to display images of a plurality of colors (for example, a red image, a green image, and a blue image) in time divisions on one display device. Alternatively, the projector may be constructed to use two or more display devices to display images of different colors on each display device so as to display images of each color superposed.

As one example, a projector is next described that uses the light source device of the first or second exemplary embodiment to display red images, green images, and blue images in time divisions on one display device.

FIG. 4 is a schematic view showing the configuration of the projector according to an exemplary embodiment of the present invention.

Referring to FIG. 4, the projector includes light source device 601, light tunnel 602, lenses 603 and 604, reflecting mirror 605, TIR (Total Internal Reflection) prism 606, display device 607, and projection lens 608.

Light source device 601 includes red light source device 110, green light source device 111, blue light source device 112, and cross-dichroic prism 113. Red light source device 110 is of the same configuration as the light source device of the first or second exemplary embodiment described above, but red LDs are used in place of blue LDs 2a. Green light source device 111 is of the same configuration as the light source device of the first or second exemplary embodiment described above, but green LDs are used in place of blue LDs 2a. Blue light source device 112 is of the same configuration as the light source device of the first or second exemplary embodiment described above. Red light source device 110, green light source device 111, and blue light source device 112 are successively lighted in a prescribed order. The lighting periods of each of red light source device 110, green light source device 111, and blue light source device 112 can be set as appropriate.

Red light source device 110 and blue light source device 112 are arranged such that their emission surfaces are opposite each other, and the optical axes of each are positioned on the same straight line. The optical axis of green light source device 111 is orthogonal to the optical axes of each of red light source device 110 and blue light source device 112. Cross-dichroic prism 113 is arranged at the portion of intersection of these optical axes.

Cross-dichroic prism 113 has first and second dichroic films that are provided so as to intersect each other. The first dichroic film has the property of transmitting light of the blue wavelength band and the green wavelength band and reflecting light of the red wavelength band. The second dichroic film has the property of transmitting light of the red wavelength band and the green wavelength band and reflecting light of the blue wavelength band.

The red light that is emitted from red light source device 110 is reflected by the first dichroic film and irradiated into light tunnel 602. The green light that is emitted from green light source device 111 is transmitted through the first and second dichroic films and irradiated into light tunnel 602. The blue light that is emitted from blue light source device 112 is reflected by the second dichroic film and irradiated into light tunnel 602.

In light tunnel 602, the irradiated light is multi-reflected in the interior with the result that light of a uniform luminance is emitted. Light tunnel 602 successively supplies red light, green light, and blue light. The light (red light, green light, and blue light) that is emitted from light tunnel 602 is irradiated into TIR (Total Internal Reflection) prism 606 by way of lenses 603 and 604 and reflecting mirror 605.

TIR prism 606 is a total reflection prism assembly provided with total reflection surfaces in its interior and includes two triangular prisms. One triangular prism is a right-angle prism having first and second surfaces that make up the sides that form a right angle and a third surface that forms the hypotenuse. The other triangular prism has first to third surfaces that each make up a segment of a triangle. The third surface of the right-angle prism is arranged to face the first surface of the other triangular prism. The first surface of the right-angle prism is the incident surface of TIR prism 606, and display device 607 is arranged to face the second surface of the right-angle prism. The second surface of the other triangular prism is the emission surface of TIR prism 606 and is parallel to the second surface of the right-angle prism. Projection lens 608 is arranged on this emission-surface side. A DMD or an LCD may be used as display device 607. Display device 607 is here assumed to be constituted by a DMD.

Display device 607 includes an image formation region that is made up of a plurality of micromirrors arranged in matrix form. The micromirrors are configured such that their angle changes in accordance with a drive voltage, the reflection angle differing when drive voltage that indicates the ON state is supplied and when drive voltage that indicates the OFF state is supplied. Through ON/OFF control of each micromirror according to a video signal, the irradiated light beam is spatially modulated to form an image.

The red light, green light, and blue light emitted from light tunnel 602 are successively irradiated into display device 607 by way of TIR prism 606. Display device 607 successively forms red images based on the red light, green images based on the green light, and blue images based on the blue light. The red images, green images, and blue images that are formed in time divisions on display device 607 are projected upon a screen by projection lens 608 by way of TIR prism 606. Projection lens 608 is an enlarging/projecting optical system made up of a plurality of lenses.

In the above-described projector, a light source device that uses a phosphor may be used in place of red light source device 110 and green light source device 111.

Explanation of Reference Numbers 2a blue LD
2b collimator lens
2c, 2d, 2h diffusion plate
2e, 2f reflecting mirror
2g, 2i lens
2j polarization beam splitter 21 light source unit
21a first laser light source group
21b second laser light source group
22, 22a light source device

The invention claimed is:

1. A light source device, comprising:
a light source unit provided with a plurality of laser light sources that are arranged in an array, wherein the laser light sources are divided into a first laser light source group and a second laser light source group;
a first diffusion plate that diffuses light emitted from said first laser light source group and that emits a first diffused light;
a second diffusion plate that diffuses light emitted from said second laser light source group and that emits a second diffused light having a larger diffusion angle than said first diffused light; and
an optical path merger that bends an optical path of said first diffused light to merge with an optical path of said second diffused light and that supplies a third diffused light in which said first and second diffused light are mixed,
wherein a color of said light emitted from said first laser light source group is same as a color of said light emitted from said second laser light source group.

2. The light source device as set forth in claim 1, wherein said optical path merger comprises:
a reflecting mirror that reflects said first diffused light; and
a polarization beam splitter that is provided at a position at which an optical path of reflected light of said first diffused light from said reflecting mirror intersects said optical path of said second diffused light, and that has a property of reflecting first polarized light and transmitting second polarized light for which a polarization direction differs from a polarization direction of said first polarized light,
wherein said first laser light source group is configured such that said first diffused light is irradiated upon one surface of said polarization beam splitter as said first polarized light, and
wherein said second laser light source group is configured such that said second diffused light is irradiated upon an other surface of said polarization beam splitter as said second polarized light.

3. The light source device as set forth in claim 1, further comprising a third diffusion plate that diffuses said third diffused light.

4. The light source device as set forth in claim 3, further comprising a reduction optical system that reduces a size of an entirety of light source images of said plurality of laser light sources,
wherein said reduction optical system is provided with at least a first lens and a second lens that is provided such that a front-side focal point of said second lens coincides with a rear-side focal point of said first lens, and
wherein said third diffusion plate is arranged between said first lens and said second lens.

5. A projector comprising:
a light source device as set forth in claim 1;
a display device that modulates light emitted from said light source device to form an image; and
a projection lens that projects the image formed by said display device.

6. The light source device as set forth in claim 1, wherein said light emitted from said first laser light source group and said light emitted from said second laser light source group include blue light.

7. The light source device as set forth in claim 1, wherein an optical path length of said first diffused light is longer than an optical path length of said second diffused light.

8. The light source device as set forth in claim 1, wherein said first laser light source group and said second laser light source group each emit said light in a same direction, and
wherein an optical path length of said first diffused light is longer than an optical path length of said second diffused light.

9. The light source device as set forth in claim 1, wherein said optical path merger includes a reflecting member that merges each optical path of a plurality of first light rays and each optical path of a plurality of second light rays such that the each optical path of said plurality of first light rays and the each optical path of said plurality of second light rays are alternately aligned in a same plane that intersects with optical paths of said third diffused light.

10. The light source device as set forth in claim 1, wherein said optical path merger includes a reflecting member that merges each optical path of a plurality of first light rays and each optical path of a plurality of second light rays such that the each optical path of said plurality of first light rays and the each optical path of said plurality of second light rays are aligned in a same plane that intersects with optical paths of said third diffused light.

11. The light source device as set forth in claim 1, wherein said optical path merger comprises:
a reflecting mirror that reflects said first diffused light; and
a polarization beam splitter that is provided at a position at which an optical path of reflected light of said first diffused light from said reflecting mirror intersects said optical path of said second diffused light.

12. The light source device as set forth in claim 11, wherein the polarization beam splitter reflects first polarized light and transmitting second polarized light for which a polarization direction differs from a polarization direction of said first polarized light.

13. The light source device as set forth in claim 12, wherein said first laser light source group is configured such that said first diffused light is irradiated upon one surface of said polarization beam splitter.

14. The light source device as set forth in claim 13, wherein said second laser light source group is configured such that said second diffused light is irradiated upon an other surface of said polarization beam splitter.

15. The light source device as set forth in claim 1, further comprising a reduction optical system that reduces a size of an entirety of light source images of said plurality of laser light sources,
wherein said reduction optical system is provided with at least a first lens and a second lens that is provided such that a front-side focal point of said second lens coincides with a rear-side focal point of said first lens, and
wherein a third diffusion plate is arranged between said first lens and said second lens.

16. A method of reducing a speckle in a projector that is provided with a plurality of laser light sources provided in an array, the method comprising:
forming a first diffused light by diffusing light emitted from a first laser light source group by a first diffusion plate;
forming a second diffused light having a diffusion angle that is larger than that of said first diffused light by diffusing light emitted from said second laser light source group by a second diffusion plate; and
forming a third diffused light in which said first and second diffused light are mixed,
wherein a color of said light emitted from said first laser light source group is same as a color of said light emitted from said second laser light source group.

17. The method as set forth in claim 16, wherein said light emitted from said first laser light source group and said light emitted from said second laser light source group include blue light.

18. The method as set forth in claim 16, wherein an optical path length of said first diffused light is longer than an optical path length of said second diffused light.

19. The method as set forth in claim 16, wherein said first laser light source group and said second laser light source group each emit said light in a same direction, and
wherein an optical path length of said first diffused light is longer than an optical path. length of said second diffused light.

20. A light source device comprising:
a light source unit provided with a plurality of laser light sources that are arranged in an array, wherein the laser light sources are divided into a first laser light source group and a second laser light source group;
a first diffusion plate that diffuses light emitted from said first laser light source group and that emits a first diffused light;
a second diffusion plate that diffuses light emitted from said second laser light source group and that emits a second diffused light having a larger diffusion angle than said first diffused light; and
an optical path merger that bends an optical oath of said first diffused light to merge with an optical path of said second diffused light and that supplies a third diffused light in which said first and second diffused light are mixed, wherein:
said first diffused light contains a plurality of first pencils of light rays that are each emitted from a respective laser light source of a plurality of laser light sources that make up said first laser light source group;
said second diffused light contains a plurality of second pencils of light rays that are each emitted from a respective laser light source of a plurality of laser light sources that make up said second laser light source group; and
said optical path merger includes a reflecting member that merges each optical path of said plurality of first pencils of light rays and each optical path of said plurality of second pencils of light rays such that the each optical path of said plurality of first pencils of light rays and the each optical path of said plurality of second pencils of light rays are alternately aligned in a same plane that intersects with optical paths of said third diffused light.

* * * * *